United States Patent
Kim

[11] Patent Number: 6,156,209
[45] Date of Patent: Dec. 5, 2000

[54] PROTEIN SKIMMER

[76] Inventor: Jason Kim, 5701 Stresemann Ave., San Diego, Calif. 92122

[21] Appl. No.: 09/248,721

[22] Filed: Feb. 11, 1999

[51] Int. Cl.[7] .............................. C02F 1/24; A01K 63/04
[52] U.S. Cl. ..................... 210/703; 210/776; 210/169; 210/416.2; 210/905; 119/263; 119/264; 261/115
[58] Field of Search ..................... 210/703, 776, 210/169, 205, 416.2, 416.1, 220, 221.1, 905, 151; 119/263, 264; 261/115, 119.1

[56] References Cited

U.S. PATENT DOCUMENTS

| | | |
|---|---|---|
| 3,616,919 | 11/1971 | Feddern et al. . |
| 3,957,017 | 5/1976 | Carmignani et al. . |
| 4,752,383 | 6/1988 | McKay ..................... 209/164 |
| 4,834,872 | 5/1989 | Overath . |
| 4,938,865 | 7/1990 | Jameson . |
| 5,078,867 | 1/1992 | Danner . |
| 5,096,572 | 3/1992 | Hwang . |
| 5,122,267 | 6/1992 | Giovanetti ............... 210/188 |
| 5,332,100 | 7/1994 | Jameson . |
| 5,380,160 | 1/1995 | Chen ......................... 417/63 |
| 5,484,525 | 1/1996 | Mowka, Jr. . |
| 5,554,280 | 9/1996 | Lochr ...................... 210/169 |
| 5,665,227 | 9/1997 | Watt ........................ 210/169 |
| 5,667,671 | 9/1997 | Munsch et al. . |
| 5,800,704 | 9/1998 | Hansen . |

*Primary Examiner*—Duane Smith
*Assistant Examiner*—Fred Prince
*Attorney, Agent, or Firm*—John R. Ross; John R. Ross, III

[57] ABSTRACT

A protein skimmer for removal of protein contaminates from protein contaminated water. An injector is used for spraying protein contaminated water into a mixing chamber having a water bubble chamber. The spraying motion causes bubble generation in the water bubble chamber. Contaminates in the water attach themselves to the bubbles and rise to the surface of the water as foam. A hollow foam riser is attached to the top of the mixing chamber and provides an exit pathway for the contaminated foam. As foam is generated, it rises through the foam riser and carries with it contaminates. A foam collection cup is attached to the top of the foam riser and collects the contaminated foam. Consequently, the water left behind in the mixing chamber is substantially more pure. The substantially more pure water exits the mixing chamber through a purified water exit aperture.

19 Claims, 9 Drawing Sheets

PROTEIN SKIMMER

BACKGROUND OF THE INVENTION

Salt and fresh water aquariums are very popular and provide enjoyment for many people. However, maintenance of the necessary water quality in aquariums is a major challenge for aquarium owners. Protein skimmers are known and have proven to be somewhat effective in managing the water quality of aquariums. A protein skimmer is used to accomplish two key tasks when used in a marine water management system. A properly functioning protein skimmer effectively oxygenates water that passes through the body of the skimmer by introducing a large number of small air bubbles into the water. A protein skimmer also serves as a method for water purification by allowing the introduced air bubbles to react with the surrounding water molecules for a period of time, which enables pollutants to gather on the surfaces of the bubbles and become chemically attached. The bubble-water mixture is then separated, and the bubbles are directed out of the body of the skimmer and collected, with adhering pollutants, in a collection cup. This allows pollutants to be permanently removed from the water system.

There are several aspects that make some protein skimmers more effective than others. Overall water flow rate through the protein skimmer is important because the more water that is processed per unit time usually means that more pollutants are removed and more gas exchange occurs. The amount of contact time between air bubbles and water, and the quality of this contact time is important as well. If the bubbles are immediately withdrawn from the skimmer as soon as they are introduced, they may not be fully saturated with pollutants. Also, if the air bubbles react with the water in a laminar, non-turbulent fashion, contact between bubbles and pollutants is reduced. Therefore, there is a chance that the bubble may not become fully saturated with pollutants. In either case, maximum efficiency is compromised.

The number of air bubbles as well as their size, is also important. Having a larger number of bubbles increases the amount of pollutants that can be skimmed out through this Pir-water interaction. Numerous, small-sized bubbles afford greater surface area for this interaction than the same volume of larger-sized bubbles.

These are the most important, but not the only aspects of protein skimming which contribute to a given skimmer's efficiency and success. In general, the goal is to maximize the number and to minimize the size of the bubbles and to maximize the time the bubbles are in contact with the water.

PRIOR ART SKIMMERS

U.S. Pat. No. 5,554,280 discloses a protein skimmer known as a "Downdraft" skimmer. This design accomplishes efficient bubble generation by injecting a smoothflowing, high-pressure stream of water through a long tube that contains special media designed to break apart and shred downwardly inducted air into froth. The tube containing the air shredding media is typically three to five times the height of the body of the skimmer, since shorter downdraft tubes holding smaller amounts of air-shredding media generally skim very inefficiently. This design critically relies on the presence of these air-shredding media for effective bubble generation. The main body of this design is a box whose main function is to separate the bubbles from the incoming water so that they can be gathered inside of a collection cup as dry foam. This type of protein skimmer is arguably the "best" and most efficient design available or known to aquarists currently. It does, however, possess several disadvantages. These are:

1. This design requires a very powerful water pump in order to make the 'downdraft' tube work successfully. Without such a strong pump, bubble production is extremely limited.
2. The amount of bubble generation depends largely on the height of the downdraft tube, which means that this type of skimmer typically stands very tall—anywhere from nearly two to over five feet tall. Obviously, such a massive piece of filtration equipment is rather cumbersome and inconvenient for a home aquarium.
3. Though this design produces a large number of bubbles, the method of bubble generation does not produce for maximally efficient quality of air-water mixing. In other words, bubbles are produced as incoming water rushes down the downdraft tube, around the air-shredding media. The bubbles and water together flow cocurrently along side one another in a laminar fashion. Since turbulent, random mixing of water and air is restricted, potential efficiency is reduced. Furthermore, once the bubbles reach the end of the downdraft tube, they are very quickly separated from the water and directed into the foam riser assembly, which also limits contact time and skimming efficiency.

U.S. Pat. No. 5,122,267 discloses a "Venturi" protein skimmer. Venturi skimmers, unlike the previously mentioned design, operate by generating bubbles via the venturi effect. These types of skimmer require a special venturi valve apparatus and a very powerful water pump in order to be effective. In most designs, water is forced through a venturi valve into the bottom of the body of the skimmer, where the bubbles then rise up a long cylindrical column and form froth at the top. Most venturi designs accomplish only a small fraction of the amount of bubble generation, or frothy scum generation, of the previously described downdraft design.

U.S. Pat. No. 5,665,277 discloses a skimmer that generates bubbles through the use of a strong air pump which forces diffused air into the body of the skimmer directly. These types of skimmers are terribly limited since most air pumps cannot supply large-enough amounts of air to facilitate efficient skimming. These designs also require a separate water pump as well, which is rather inefficient.

Yet another method for bubble generation is described in U.S. Pat. No. 5,380,160. This type of skimmer utilizes the venturi effect, in combination with the bubble shredding effect that can be imparted by directing air through the impeller shaft of a spinning water pump. Because this design relies on the venturi effect, it suffers from the same pitfalls already mentioned.

EVALUATING PRIOR ART PROTEIN SKIMMERS

The efficiency of a given protein skimmer design is generally rated by either:
1. the quality/quantity of frothy scum produced, or
2. direct observation of the quality/quantity of bubbles produced per unit time.

With regards to the first criteria, production of small-sized bubbles is highly desirable (approximately 0.5 millimeters in diameter), since a given space filled with smaller bubbles offers greater overall air surface area that would larger bubbles. Generally, it follows that the more bubbles which are generated, the more pollutants which can be removed. Simply put, a good skimmer produces a large number of very small bubbles. Since most designs of protein skimmer feature transparent chambers or mixing columns, this factor can be easily rated.

With regards to the second criteria, the quality of frothy scum is usually rated by observing its color, thickness, and smell. A good quality scum is dark (coffee-like), paste-like in consistency, and smells rotten. A good skimmer produces large amounts of this type of scum.

Two diagnostic tests were performed in order to rate and determine the efficiency of the present invention against previously described models. Several control parameters were instituted in order to achieve consistency of data and to avoid the collection of incorrect information. All of the protein skimmers tested were collectively hooked up to a single, large marine aquarium filled with various live animals, and thus were "competing with one another" under the same exact environmental conditions. Each skimmer was operated according to manufacturer specifications. This test was performed continuously over the course of a two-week period, by which time each skimmer had stabilized and a very obvious hierarchy in skimmer efficiency was apparent. One representative was chosen to represent each of the four known "main types of protein skimmer"—those being the Air-driven, the Venturi, the Needle-wheel, and the Downdraft. The models chosen were all highly regarded and among the best in their class. All of the skimmers tested were designed (according to manufacturer's specs) to be operated on a tank capacity of approximately 100 gallons, thus a powerful skimmer designed for a 1,000 gallon system was not unfairly pitted against a model designed for a 40 gallon system. The two factors which were measured were:

1. Bubble Quality (size, number, and amount of contact with water)
2. Scum Production (color, smell, and quantity)

RESULTS

AIR DRIVEN SKIMMER: This model performed terribly relative to the others. Bubble production was severely limited and the quantity of foam produced was very low. Very little froth was collected.

VENTURI SKIMMER and NEEDLE-WHEEL SKIMMER: Both these models performed equally, producing a fair amount of bubbles and frothy scum. The quality of froth and quantity of bubbles generated were noticeably less than the downdraft model.

DOWNDRAFT SKIMMER: Of the prior art skimmers tested, this skimmer performed the best, producing over twice as much frothy scum than any of the above models. Based on careful observation, it also generated over twice as many bubbles as the others, which contributed to the production of a large amount of a very good frothy scum. However, the results were still less than satisfactory because the bubble quality and scum production were still too low.

What is needed is a better protein skimmer.

SUMMARY OF THE INVENTION

The present invention provides a protein skimmer for removal of protein contaminates from protein contaminated water. An injector is used for spraying protein contaminated water into a mixing chamber having a water bubble chamber. The spraying motion causes bubble generation in the water bubble chamber. Contaminates in the water attach themselves to the bubbles and rise to the surface of the water as foam. A hollow foam riser is attached to the top of the mixing chamber and provides an exit pathway for the contaminated foam. As foam is generated, it rises through the foam riser and carries with it contaminates. A foam collection cup is attached to the top of the foam riser and collects the contaminated foam. Consequently, the water left behind in the mixing chamber is substantially more pure. The substantially more pure water exits the mixing chamber through a purified water exit aperture.

DETAILED DESCRIPTION OF THE PREFERRED EMBODIMENT

The present invention uses a combination of spray induction and turbulent bombardment for producing bubbles and for maximizing effective contact time between bubbles and water. This method generates massive numbers of bubbles in a small, confirmed space—relieving the need for a large water pump or a tall and bulky mixing chamber or downdraft tube.

Bubbles are produced by injecting a high-pressure spray directly onto the surface of a water-filled chamber at close range. These bubbles are generated immediately, and require no special media or further mechanical or chemical process to aid in formation. Once the bubbles enter the chamber they are subjected to high levels of fiercely turbulent mixing and bombard each other in a random fashion. This forceful bombardment leads to highly effective foam fractionation.

First Preferred Embodiment

Figure 9:
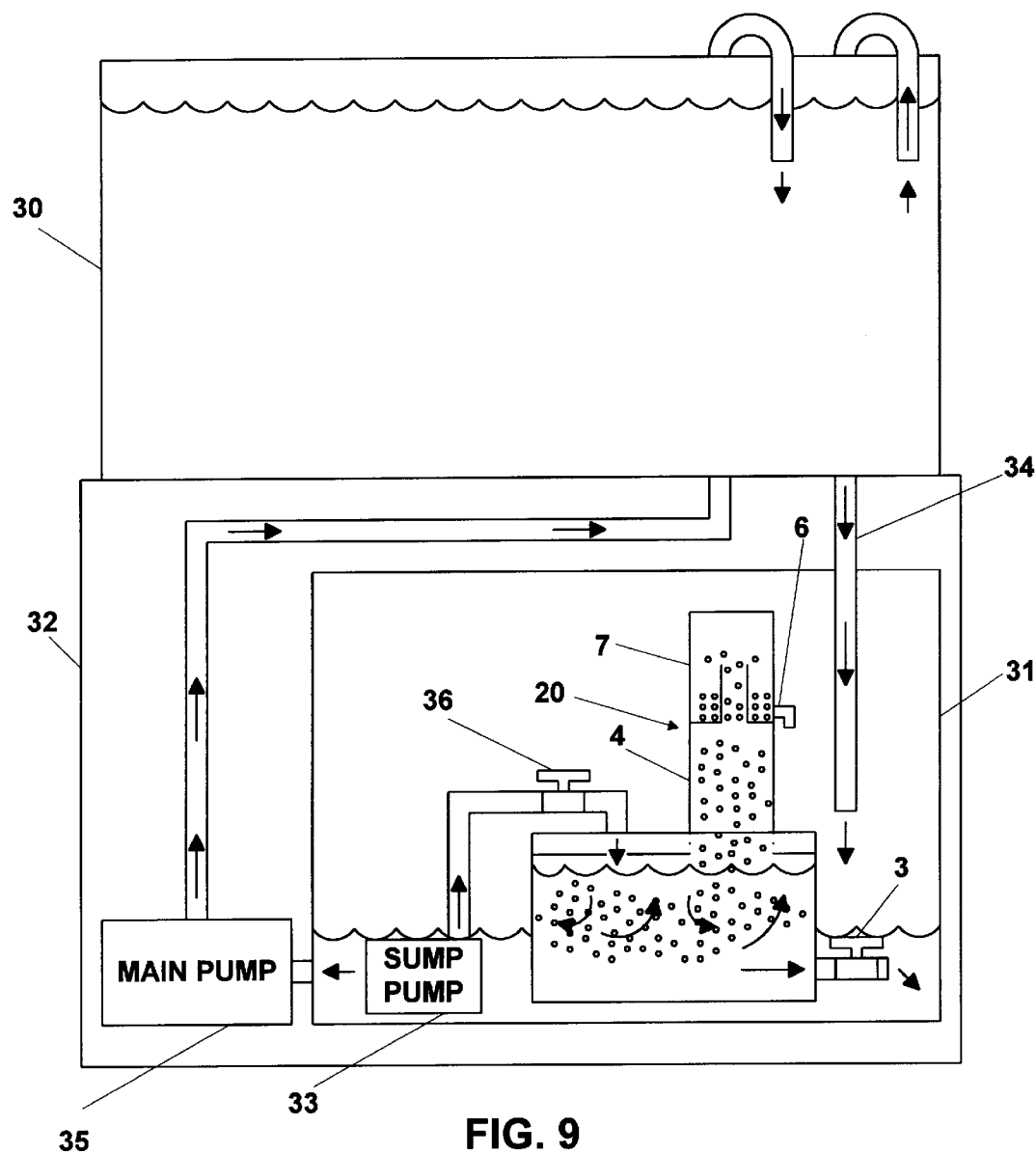
FIG. 9 shows the first preferred embodiment of the present invention connected to an aquarium in a first configuration.

A first preferred embodiment of the present invention is shown in FIG. 9. Aquarium 30 with a capacity of 100 gallons rests on top of aquarium cabinet 32. Aquarium water is siphoned through pipe 34 and into sump 31. Protein skimmer 20 and submersible pump 33 are mounted inside sump 31. Submersible pump 33 draws water from sump 31 and pumps it to protein skimmer 20 through valve 36. Submersible pump 33 is rated at 8 gallons per minute when pumping against a head of 2 feet of water. Inside protein skimmer 20, contaminated foam is created and rises up through foam riser 4 and is collected in collection cup 7. Contaminated foam and scum can be drained through collection cup drain 6.

As contaminates attach to the foam and rise through protein skimmer 20, water that is relatively pure is left behind and exits through gate valve 3 and back into sump 31. It is important to note that the water level in sump 31 must always be lower than the water level in protein skimmer 20, since protein skimmer 20 relies on gravity to drain the water out. Valve 36 and gate valve 3 are adjusted to work in conjunction to maintain the water level inside of protein skimmer 20 at an optimum height while in this embodiment permitting a flow rate of about 8 gallons per minute.

Main pump 35 draws water from sump 31 and pumps it back to aquarium 30. In this preferred embodiment with a 100-gallon aquarium 30, main pump 35 has a capacity of 5 gallons/min pumping against a head of 4 feet.

Skimmer

Figure 1:
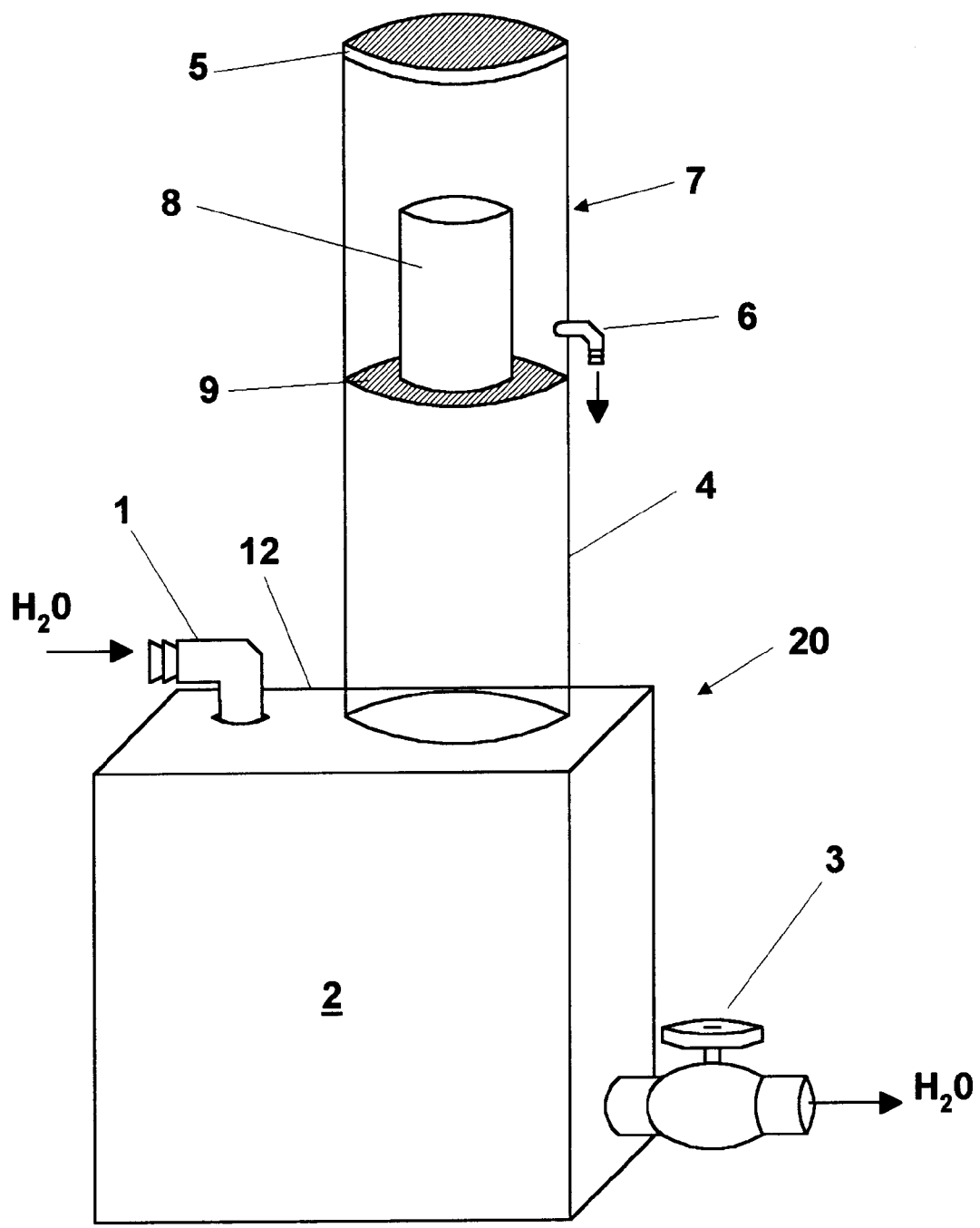
FIG. 1 shows a perspective view of the first preferred embodiment of the present invention.

FIG. 1 shows a perspective view of skimmer 20. Contaminated water flows through injector assembly 1 and into mixing chamber 2. Injector assembly 1 is rigidly connected to top 12 of mixing chamber 2. Inside mixing chamber 2, purified water and contaminated foam are separated. The foam containing contaminates rises through foam riser 4 and is collected in collection cup 7. Collection cup 7 is comprised of hollow tube 8, bottom section 9, and lid 5. Contaminated foam and scum are drained out of collection cup 7 through collection cup drain 6. Purified water exits mixing chamber 2 through gate valve 3 and is pumped back to the aquarium.

Figure 2:
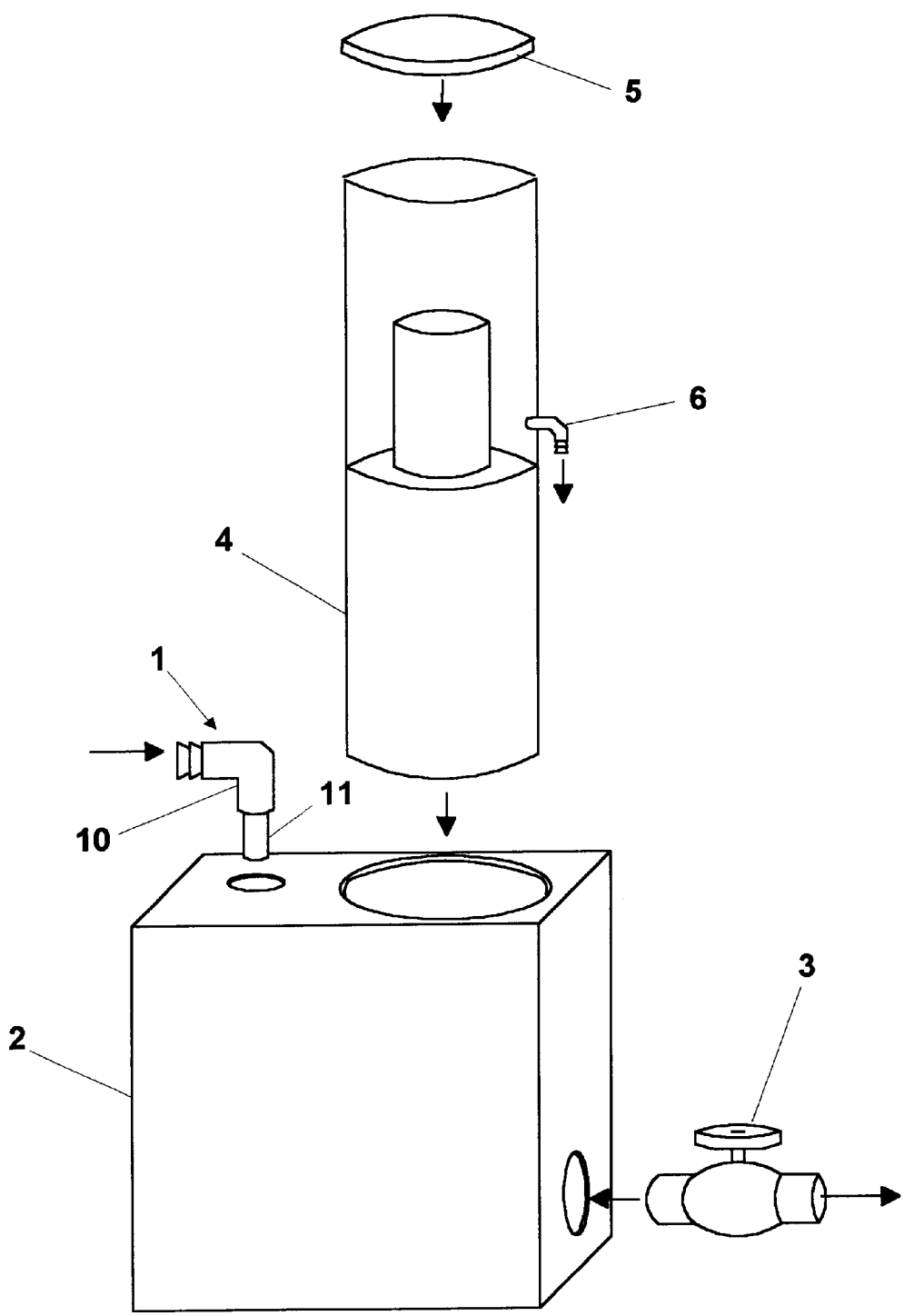
FIG. 2 shows an exploded view of the first preferred embodiment of the present invention.
Figure 6:
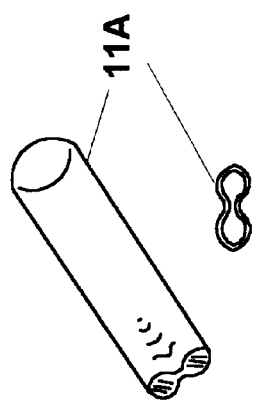
FIG. 6 shows end and side views of a preferred injector.
Figure 5:
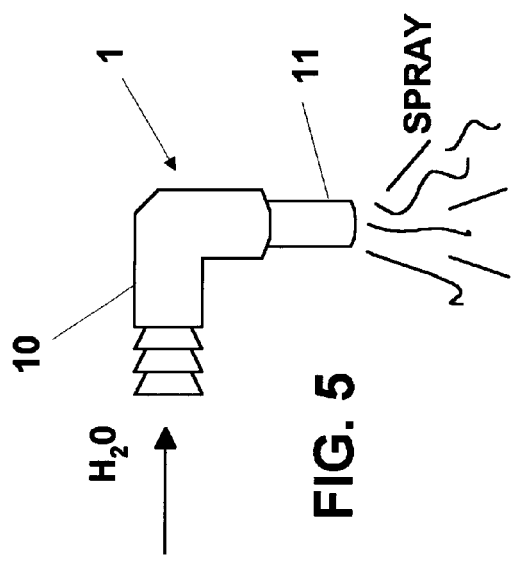
FIG. 5 shows the injector assembly.

FIG. 2 shows an exploded view of skimmer 20. Injector assembly 1, shown in detail in FIG. 5, is comprised of L-shaped hose barb 10 and injector 11. Preferably, injector 11 is threaded into L-shaped hose barb 10 for a tight fit. FIG. 6 shows a preferred design of injector 11. This injector is simply formed by molding a hollow cylindrical tube with a ½ inch inner diameter into a figure eight shape having a cross sectional area at the tip of about ¼ square inch.

Interior Components of the Mixing Chamber

Figure 3:
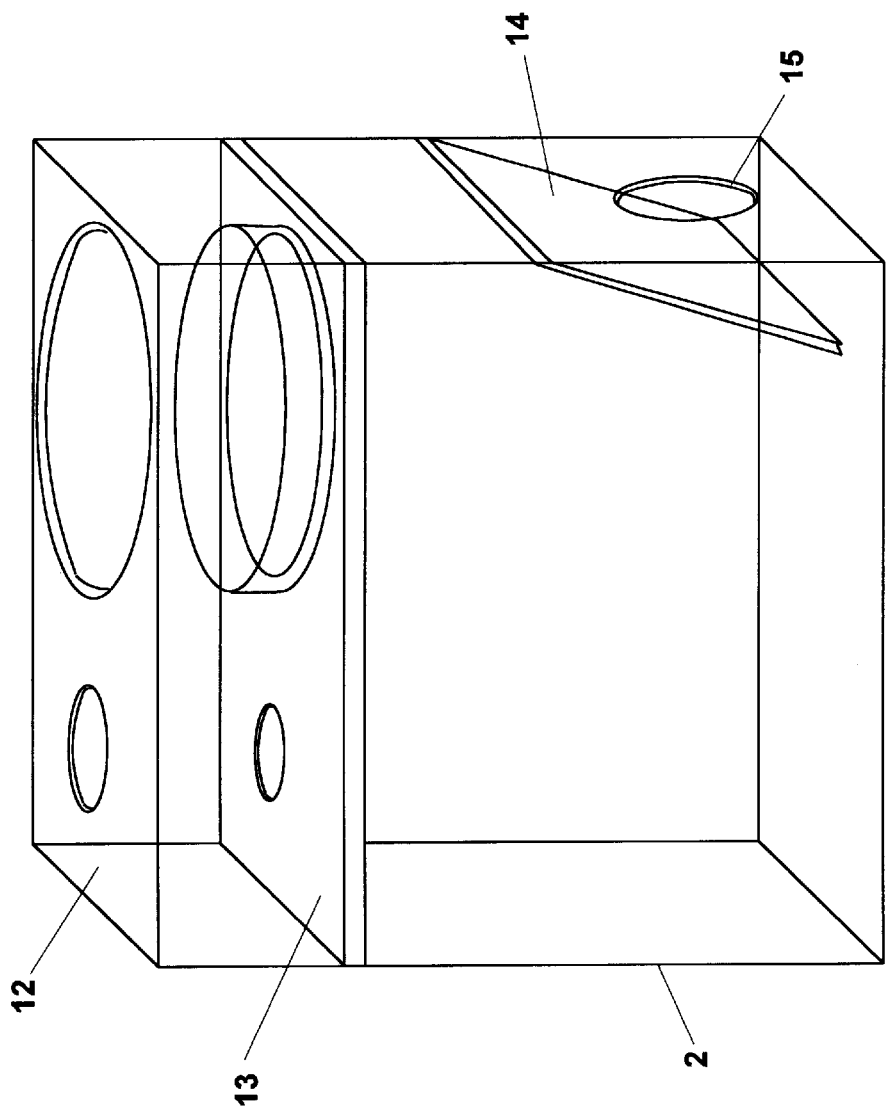
FIG. 3 shows a perspective view of the mixing chamber.
Figure 4:
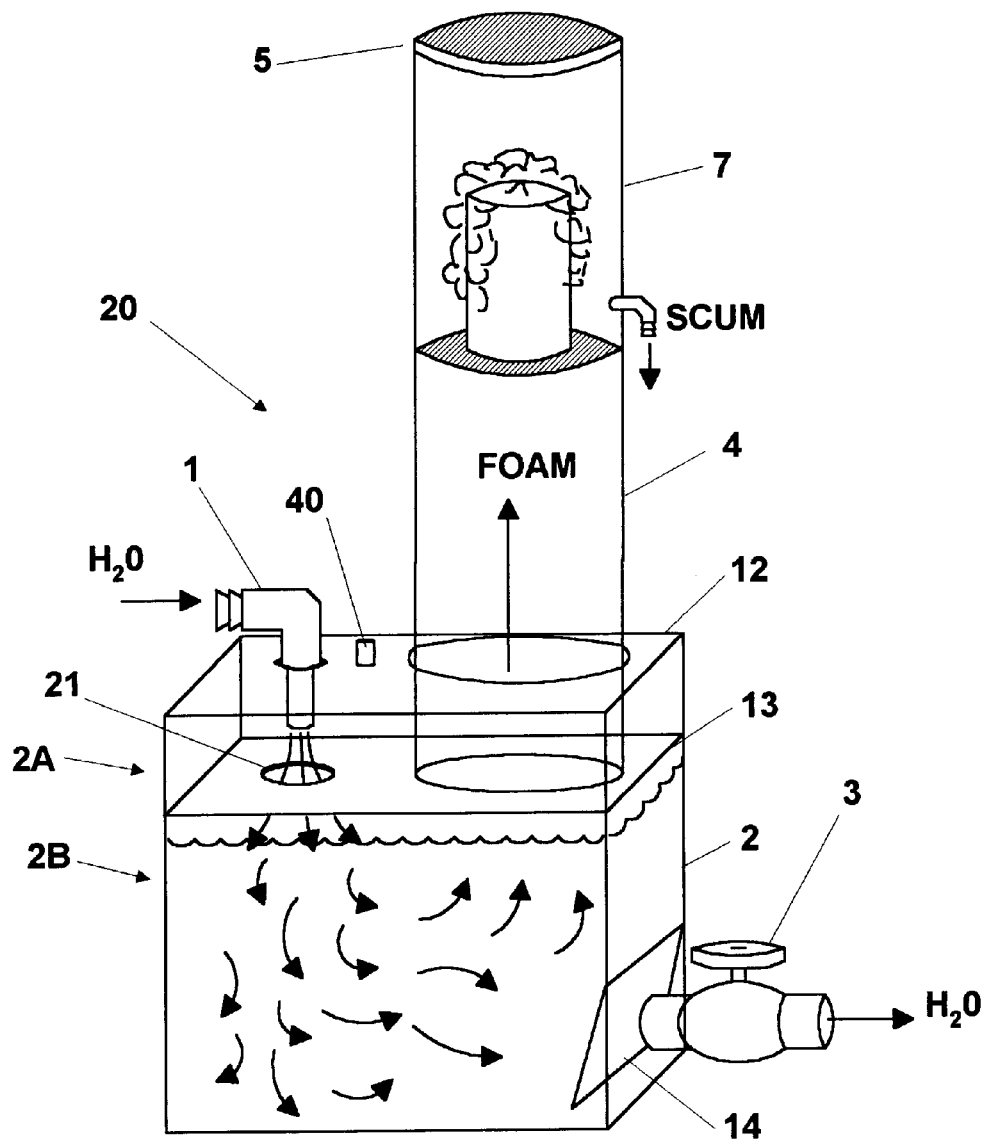
FIG. 4 shows a first preferred embodiment of the present invention in operation.

FIG. 3 shows the interior components of mixing chamber 2. Approximately one inch below top 12, separator plate 13 is rigidly attached to the inside walls of mixing chamber 2 and separates chamber 2 into water-bubble chamber 2B having a volume of about 300 $in^3$ and air chamber 2A having a volume of about 35 $in^3$, as seen in FIG. 4. Separator plate 13 provides support for foam riser 4, as shown in FIG. 4. The purpose of top 12 is to help block random splashing and to provide support for injector 11. Baffle plate 14 is rigidly attached to the side of mixing chamber 2 in front of opening 15. When protein skimmer 20 is in operation, water motion inside mixing chamber 2 is very turbulent, as indicated by the arrows in FIG. 4. As previously discussed turbulent water contains bubbles with contaminates attached. Baffle plate 14 substantially blocks the turbulent currents from contacting opening 15. Non-turbulent water with relatively few bubbles and reduced contaminates, however, is permitted to flow underneath the bottom of baffle plate 14 and through gate valve 3, as shown in FIG. 4. A vent 40 is provided as shown in FIG. 4 to permit clean air to enter air chamber 2A.

Controlling the Turbulent Water/Foam Mixture inside the Mixing Chamber

As shown in FIG. 4, the space between top 12 and separator plate 13 is filled with air, while water and foam are contained below separator plate 13. The distance between the bottom of injector 11 and the top of the water is approximately one inch. This distance is ideal for the creation of turbulent water. The water level inside mixing chamber 2 is preferably controlled by gate valve 3 (normally valve 36 is fully open). Gate valve 3 should be adjusted so that the water level inside of mixing chamber 2 is allowed to rise close to the bottom of separator plate 13, without overflowing into the space between separator plate 13 and top 12.

Foam Production and Contamination Removal

As shown in FIG. 4, injector 1 is positioned so that its bottom edge is approximately one inch above the turbulent water. At a flow rate of 8 gallons per minute and a nozzle cross section of about ¼ $in^2$, water exits injector 11 at a speed of approximately 10 feet/sec. When water spray leaves injector 11 and hits the water in mixing chamber 2 at this speed, many bubbles are created. Also, as previously stated the impact of the spray upon the water contained in mixing chamber 2, causes that water to flow with turbulence. The turbulent motion moves the air bubbles throughout the mixing chamber so that the bubbles on average are in contact with the contaminated water for up to approximately one minute. As foam is produced, it rises upward. Foam is prevented from rising up through opening 21 (which is only slightly larger than the spray cross section) because the spray knocks it back down. Instead, as the foam is continuously produced it rises up through foam riser 4 and is collected in collection cup 7. Contaminated foam and scum is emptied through collection cup drain 6.

The Spray Injector

FIG. 5 shows a side view of injector assembly 11 with injector 1 threaded into L-shaped hose barb 10. The tip of injector 11 can be any shaped port which produces a suitable spray pattern, though some spray patterns are noticeably more efficient than others. Injectors that produce a small (1–2 inch diameter) spray are the most effective. Side and front views of a preferred injector 11A are shown in FIG. 6. The "figure-eight" shaped tip provides an optimum spray pattern.

Second Preferred Embodiment

Figure 10:
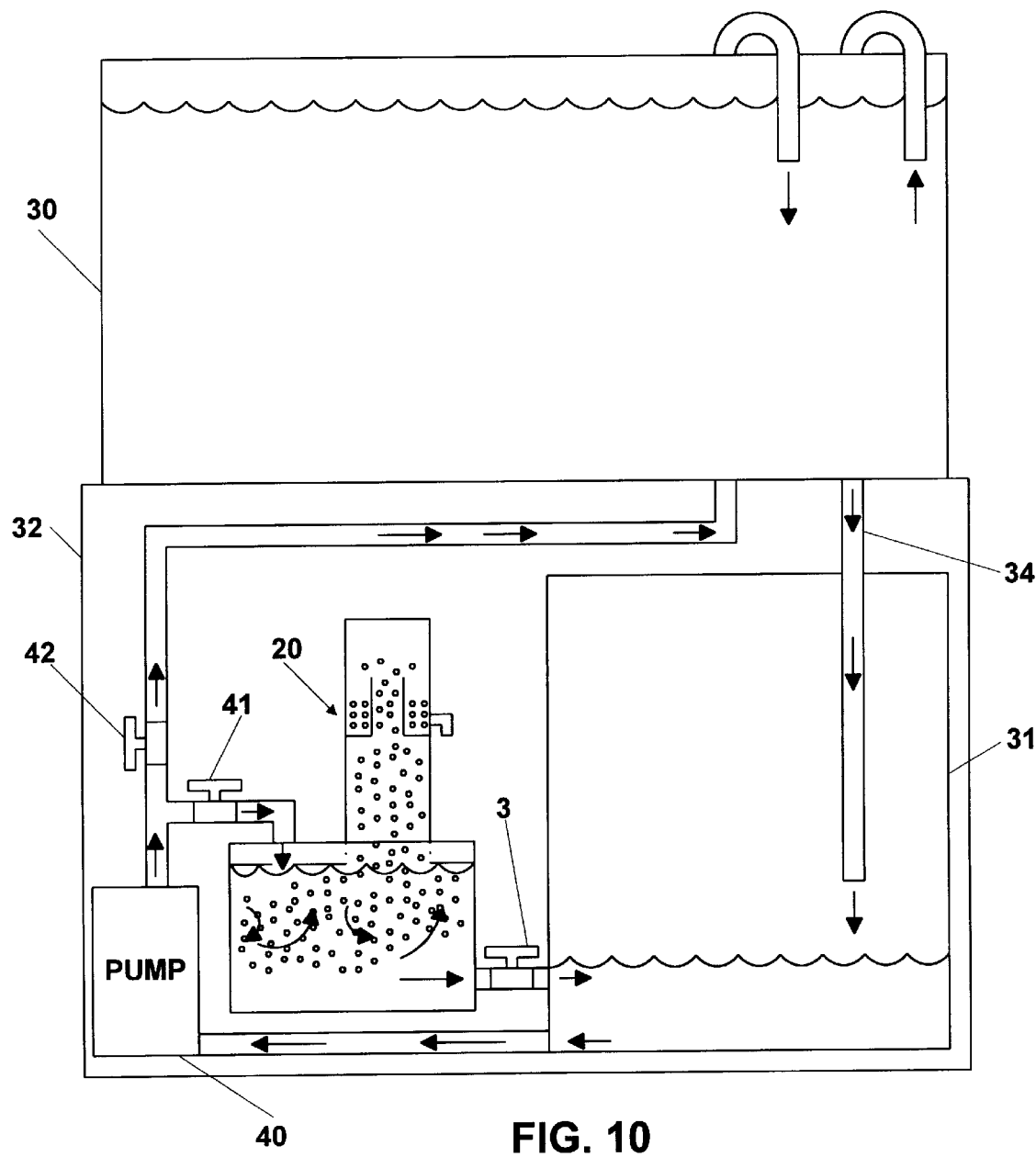
FIG. 10 shows the first preferred embodiment of the present invention connected to an aquarium in a second configuration.
Figure 11:
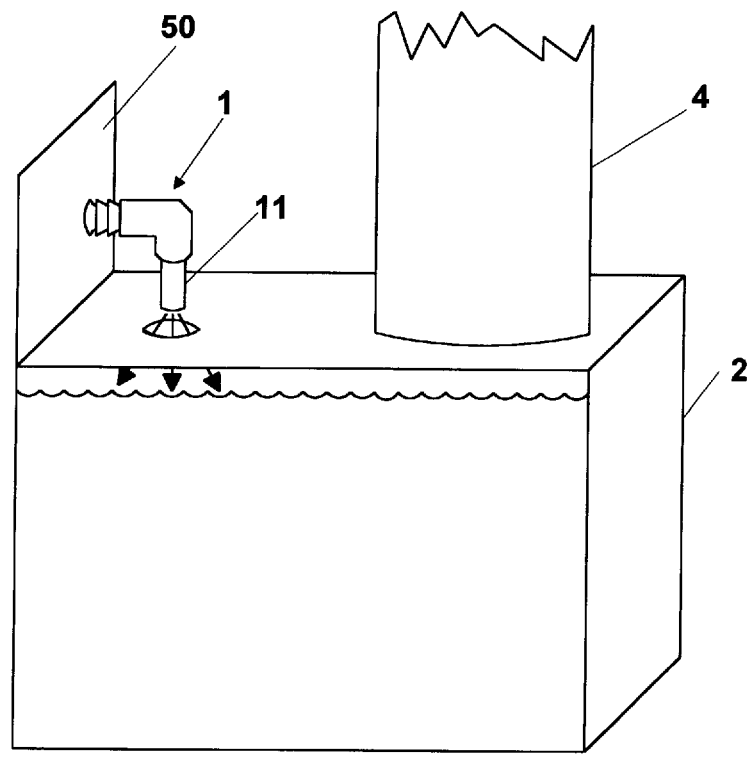
FIG. 11 shows another preferred embodiment of the present invention.

FIG. 10 shows a second embodiment of the present invention using a single pump. Aquarium 30 rests on top of aquarium cabinet 32. Aquarium water is siphoned through pipe 34 and into sump 31. Pump 40 draws water out of sump 31 and pumps some of the water back to aquarium 30 through valve 42 and pumps some of the water to protein skimmer 20 through valve 41. Inside protein skimmer 20, contaminated foam is separated from the water, as explained under the first configuration. Valve 41 and gate valve 3 work in conjunction to maintain the water level inside of protein skimmer 20 at an optimum height. In this preferred embodiment, for a 100-gallon aquarium, pump 40 is rated at 12 gal/min at a 4-ft head. Preferably, about 50 percent of the flow from pump 40 is through skimmer 20. Valve 42 is adjusted to maintain the water level in aquarium 30 at a desired level Third Preferred Embodiment FIG. 11 shows a third preferred embodiment without an air chamber. In the third preferred embodiment injector assembly 1 is suspended from suspension plate 50 so that injector 11 is approximately one inch above the water. Suspension plate 50 is rigidly attached to the side of mixing chamber 2. In the third preferred embodiment, spray leaving injector 11 is mixed with the ambient air outside mixing chamber 2 to create bubbles in the water inside mixing chamber 2. Foam riser 4 rests directly on chamber top 34.

Figure 12:
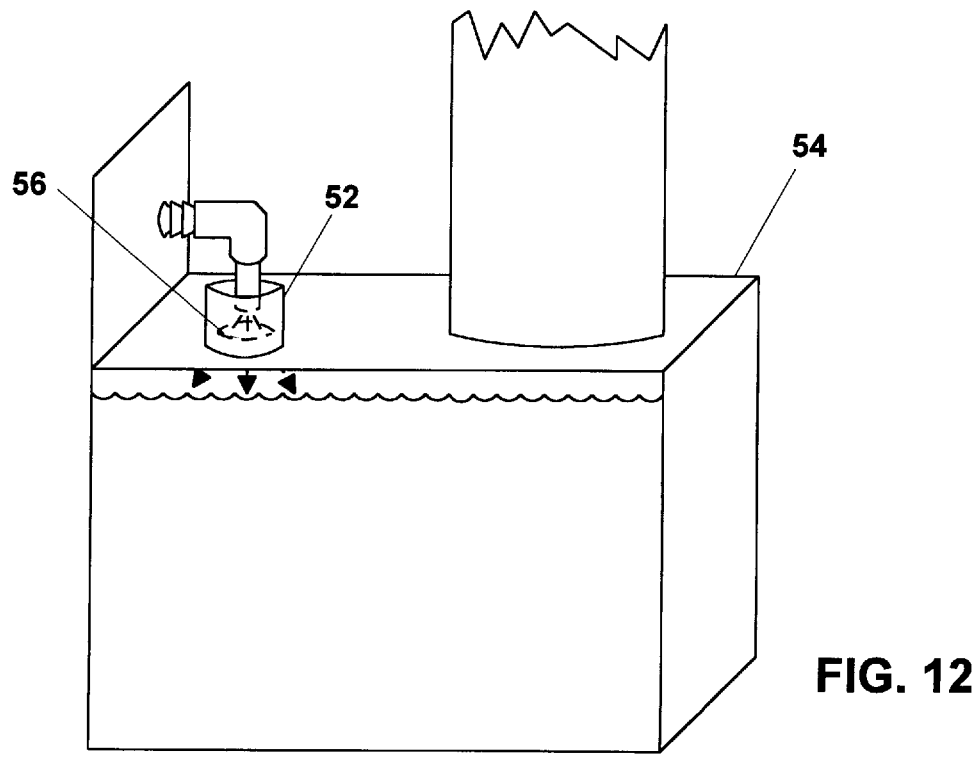
FIG. 12 shows another preferred embodiment of the present invention.

FIG. 12 shows a splash guard 52 attached to chamber top 54. This helps prevent splashing and leakage through hole 56.

Figure 13:
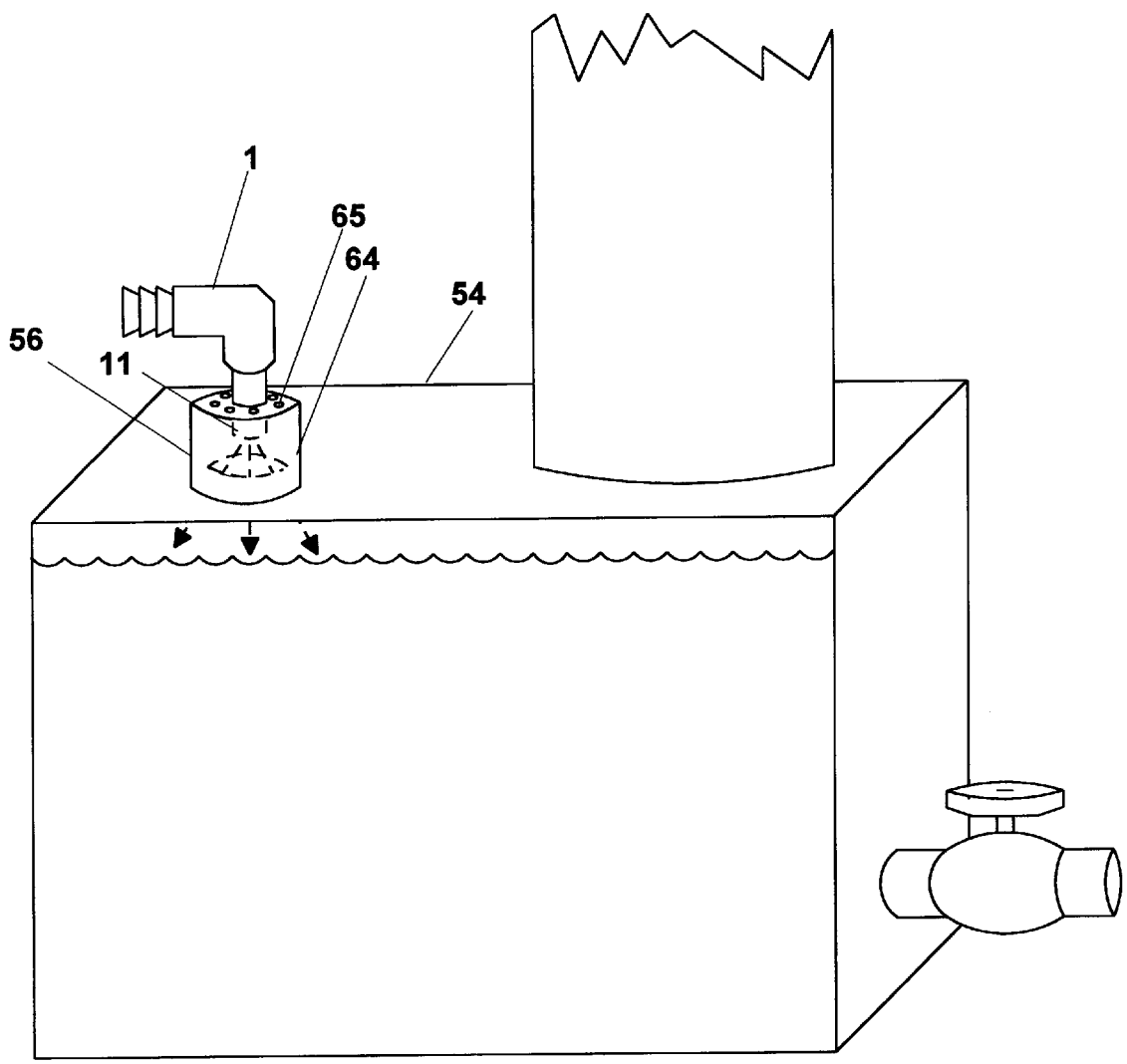
FIG. 13 shows another preferred embodiment of the present invention.

FIG. 13 shows a splash guard 64 attached to chamber top 54. Splash guard 64 helps prevent splashing and leakage through hole 56. In addition, splash guard 64 is able to provide support for injector assembly 1 so that injector 11 is suspended approximately 1 inch above the water. Holes 65 allow outside air to mix with the contaminated water leaving injector 11.

Comparison of Present Invention to Prior Art Protein Skimmers

A test was conducted to compare the performance of the present invention with the prior art protein skimmers described in the background section of this specification. The present invention was given the same test under the same conditions with positive results and proved conclusively to be a far superior design than all others. Despite its small size and water pump, the amount of bubble generation was approximately triple that of the second best skimmer, the downdraft design. The frothy scum collected was also of high quality and nearly twice that of the downdraft model in liquid volume.

Figure 7:
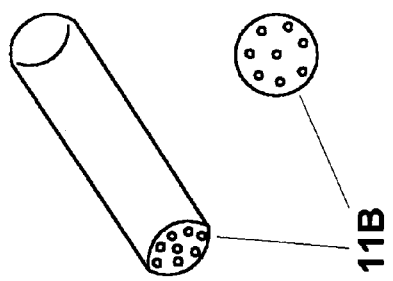
FIG. 7 shows end and side views of another preferred injector.
Figure 8:
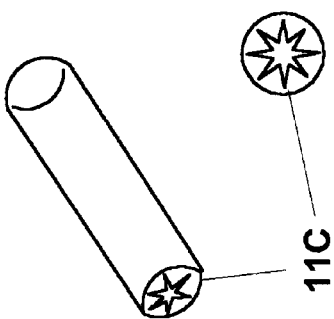
FIG. 8 shows end and side views of another preferred injector.

While the above description contains many specifications, the reader should not construe these as limitations on the scope of the invention, but merely as exemplifications of preferred embodiments thereof. Those skilled in the art will envision many other possible variations are within its scope. For example, gate valve 3 was defined as being a gate valve. However, other valves would also be adequate, such as a ball valve. Also, a pipe coupling that could be raised and lowered to alter flow rates could be used. The walls of foam riser 4 were shown as being substantially parallel (i.e., a cylinder). However, foam riser 4 could be a variety of shapes (i.e., for example, its cross section could be hexagonal, elliptical, or square). The present invention was described as having one injector. However, it would be possible to have a plurality of injectors each spraying contaminated water into the mixing chamber. This could increase the rate of foam production. FIG. 9 and FIG. 10 showed protein skimmer 20 contained in the sump tank and next to the sump tank, respectively. However, it would be possible to locate protein skimmer 20 in another position, such as hanging off the side of the aquarium. A preferred injector 11A was shown in FIG. 6. However, other injector designs that provide a spray are also effective. Examples are injector 11B as shown in FIG. 7 or injector 11C as shown in FIG. 8. Also, a tapered nozzle could be used as injector 11 to achieve a spray effect. Or even a high pressure spray nozzle similar to those found on the end of an ordinary garden hose would work. The first preferred embodiment showed baffle plate 14 covering opening 15 of mixing chamber 2. However, it would also be possible to remove baffle plate 14 and still have a functional mixing chamber provided that opening 15 was low in mixing chamber 2. In other words, because bubbles float most contaminates attached to the bubbles would tend to float past opening 15 even if baffle plate 14 was omitted. In FIG. 4, vent 40 was shown and described as functioning to permit ambient air to enter air chamber 2A. However, it is possible to omit vent 40 and allow air to enter air chamber 2A by slightly decreasing the diameter of foam riser 4. In that case, air could enter air chamber 2A by flowing between foam riser 4 and the foam riser hole in top 12.

Accordingly the reader is requested to determine the scope of the invention by the appended claims and their legal equivalents, and not by the examples which have been given.

What is claimed is:

1. A protein skimmer for removal of protein contaminates from protein contaminated water, comprising:

A) a mixing chamber, comprising
  1) a water bubble chamber, comprising
    a) a water bubble chamber top covering said water bubble chamber, said water bubble chamber top comprising:
      1) a spray aperture, and
      2) a foam exit aperture, and
    b) a purified water exit aperture, B) a spray injector having a spray tip positioned above said water bubble chamber and arranged to direct a spray of protein contaminated water through said spray aperture onto the surface of contaminated water contained within said water bubble chamber, C) a foam collection cup comprising:
  1) an outer wall defining an outer wall height,
  2) a cup bottom,
  3) a walled port providing a port through said cup bottom and having walls with a height lower than said outer wall height, and
  4) a drain positioned near said collection cup bottom and penetrating said outer wall, and D) a hollow foam riser extending upward from said foam exit aperture to said walled port to permit foam created in said water bubble chamber by spray from said spray injector to rise from said water bubble chamber through said walled port and collect in said collection cup.

2. A protein skimmer as in claim 1, wherein said mixing chamber further comprises an air chamber wherein said air chamber covers at least a portion of said water bubble chamber top.

3. A protein skimmer as in claim 1, further comprising a baffle plate rigidly attached to the inside of said mixing chamber in front of said purified water exit aperture to help prevent bubbles inside said water bubble chamber from leaving said water bubble chamber through said purified water exit aperture.

4. A protein skimmer as in claim 1, further comprising a purified water exit pipe connected to said purified water exit aperture.

5. A protein skimmer as in claim 4, further comprising a purified water exit pipe valve for regulating the flow of purified water out of said mixing chamber and for regulating the water level inside of said mixing chamber.

6. A protein skimmer as in claim 5, wherein said purified water exit pipe valve is a gate valve.

7. A protein skimmer as in claim 1, wherein said hollow foam riser is cylindrically shaped.

8. A protein skimmer as in claim 1, wherein said hollow foam riser is hexagonally shaped.

9. A protein skimmer as in claim 1, wherein said spray injector is a plurality of spray injectors.

10. A protein skimmer as in claim 1, wherein said spray injector is a tapered nozzle.

11. A method for separating protein contaminates from protein contaminated water, comprising:

A) spraying protein contaminated water from a spray injector,

B) receiving the sprayed contaminated water from said spray injector onto the surface of contaminated water contained within a mixing chamber, wherein said spraying causes bubble generation and turbulence, wherein the bubble generation and turbulence causes foam generation and wherein contaminates attach to the foam, C) providing an exit pathway for the contaminated foam with a hollow foam riser wherein said hollow foam riser is attached to said mixing chamber, wherein the contaminated foam rises through said foam riser and is separated from the water in said mixing chamber, D) collecting the contaminated foam rising through said hollow foam riser in a collection cup attached to said top of said hollow foam riser, E) draining the contaminated foam from said collection cup through a collection cup drain attached to said collection cup, and F) providing an exit pathway for purified water with a purified water exit pipe, wherein said purified water exit pipe is attached to said mixing chamber.

12. A method as in claim 11, further comprising the step of regulating the flow of purified water out of said mixing chamber with a purified water exit pipe valve.

13. A method as in claim 12, wherein said purified water exit pipe valve is a gate valve.

14. A method as in claim 11, wherein said collection cup comprises:

A) an outer wall defining an outer wall height,

B) a cup bottom,

C) a walled port providing a port through said cup bottom and having walls with a height lower than said outer wall height, and D) a drain positioned near said collection cup bottom and penetrating said outer wall.

15. A method as in claim 11, wherein said hollow foam riser is cylindrically shaped.

16. A method as in claim 11, wherein said hollow foam riser is cone shaped.

17. A method as in claim 11, wherein said spray injector is a plurality of spray injectors.

18. A method as in claim 11, wherein said spray injector is a tapered nozzle.

19. A protein skimmer for removal of protein contaminates from protein contaminated water, comprising:

A) a spraying means for spraying protein contaminated water,

B) a receiving means for receiving the sprayed contaminated water from said spraying means onto the surface of contaminated water contained within said receiving means, wherein said spraying causes bubble generation and turbulence, wherein the bubble generation and turbulence causes foam generation and wherein contaminates attach to the foam, C) a foam removal means for providing an exit pathway for the contaminated foam, wherein the contaminated foam rises through said foam removal means and is separated from the water in said receiving means, D) a collection means for collecting the contaminated foam rising through said foam removal means, E) a draining means for draining the contaminated foam from said collection means, and F) a purified water exit means for providing an exit pathway for purified water inside said receiving means.

* * * * *